(12) United States Patent  (10) Patent No.: US 8,553,168 B2
Lee  (45) Date of Patent: Oct. 8, 2013

(54) OPTICAL FILM FOR INCREASING THE VIEWING ANGLE OF LIQUID CRYSTAL DISPLAY DEVICES

(75) Inventor: Wai-Hon Lee, Los Altos, CA (US)

(73) Assignee: Finity Labs, Mountain View, CA (US)

( * ) Notice: Subject to any disclaimer, the term of this patent is extended or adjusted under 35 U.S.C. 154(b) by 173 days.

(21) Appl. No.: 13/095,027

(22) Filed: Apr. 27, 2011

(65) Prior Publication Data

US 2012/0274873 A1  Nov. 1, 2012

(51) Int. Cl.
G02F 1/1335 (2006.01)
(52) U.S. Cl.
USPC ............................................. 349/57; 349/95
(58) Field of Classification Search
USPC ...................................... 349/57, 95
See application file for complete search history.

(56) References Cited

U.S. PATENT DOCUMENTS

| | | | | |
|---|---|---|---|---|
| 5,504,597 A | * | 4/1996 | Sprague et al. | 349/57 |
| 6,822,707 B2 | * | 11/2004 | Ariyoshi et al. | 349/112 |
| 6,924,856 B2 | * | 8/2005 | Okumura et al. | 349/96 |

* cited by examiner

*Primary Examiner* — James Dudek
(74) *Attorney, Agent, or Firm* — Kilpatrick Townsend & Stockton LLP

(57) ABSTRACT

Techniques and devices are disclosed to enhance or increase the viewing angle of liquid crystal display (LCD) device through the use of one or more types of optical films. Such optical films can include arrays of prism structures and/or diffractive elements that redirect light that has passed through an LCD panel. The prism structures and/or diffractive elements can be spaced on an optical film to enable at least a portion of the light travelling through the LCD panel to pass through the optical film without being redirected. Various types of prism structures and/or diffractive elements can be used, and they can be configured on the optical film differently to enable different functionality.

16 Claims, 4 Drawing Sheets

OPTICAL FILM FOR INCREASING THE VIEWING ANGLE OF LIQUID CRYSTAL DISPLAY DEVICES

BACKGROUND OF THE INVENTION

FIG. 1 shows various common components of a liquid crystal display (LCD) device 100. A back light unit 101, for example, produces a near uniform light pattern for illuminating the LCD panel 103. The LCD panel 103 is sandwiched between two polarizers 102. A first polarizer 102 is located between the back light unit 101 and the LCD panel 103 to polarize the light entering the LCD panel 103. A second polarizer 102 is located on the opposite side of the LCD panel 103 is polarized in a direction perpendicular to the first polarizer 102 to block any light that did not change polarization while passing through the LCD panel 103. Additionally, LCD devices 100 often include a cover glass 105 to protect the internal components.

The viewing angle of such LCD devices 100, however, is limited. Without means to further increase the viewing angle, the viewing angle typically is about +/−30 degrees, which is inadequate for many applications, such as television or mobile computing devices. In fact, for tablets and mobile phones a wide viewing angle is necessary to allow sharing of the display by multiple users. Solutions that involve placing a light scattering film between the polarizer 102 and the cover glass 105 often can reduce the clarity of an image on the LCD device 100. More complex solutions, such as altering the LCD panel, can be costly.

BRIEF SUMMARY OF THE INVENTION

Techniques and devices disclosed herein involve utilizing an optical film to increase the viewing angle of liquid crystal display (LCD) devices. Such optical films can include arrays of prism structures and/or diffractive elements that redirect light that has passed through an LCD panel. The prism structures and/or diffractive elements can be spaced on an optical film to enable at least a portion of the light travelling through the LCD panel to pass through the optical film without being redirected. As detailed herein, various types of prism structures and/or diffractive elements can be used, and they can be configured on the optical film differently to enable different functionality.

An example of a liquid crystal display (LCD) device according to the disclosure includes a back light unit, a first polarizer, an LCD panel, a second polarizer, a transparent cover, and a film for redirecting light. The film can have a first refractive index and a plurality of structures for redirecting light where the plurality of structures located on a surface of the film. A plurality of areas on the surface of the film can be without structures for redirecting light. Finally, the film can be located between the second polarizer and the transparent cover.

Implementations of such an LCD device may include one or more of the following features. A prism film, where the plurality of structures include a plurality of prism structures. The plurality of prism structures periodically spaced along at least one dimension of the prism film. Each of the plurality of prism structures with a certain width, and a distance between each of the plurality of prism structures that is greater than the certain width of the prism structure. For a period equal to the width of a first prism structure plus the distance between the first prism structure and a second prism structure, the distance between the first prism structure and the second prism structure that comprises 75% to 85% of the period. An apex of each of the plurality of prism structures that faces the second polarizer. A media located between the prism film and the second polarizer, the media having a second refractive index lower than the first refractive index. Each of the plurality of prism structures being triangular. For a period equal to the width of a first prism structure plus the distance between the first prism structure and a second prism structure, the period less than a width of a color element in the LCD panel.

Another example of an LCD device according to the disclosure includes a back light unit, a first polarizer, an LCD panel, a second polarizer, a transparent cover, and a diffractive film having a first refractive index and a plurality of diffractive structures. The diffractive film can be located between the second polarizer and the transparent cover.

Implementations of such an LCD device may include one or more of the following features. A plurality of groups of diffractive structures periodically spaced along at least one dimension of the diffractive film. For a period equal to the width of a first group plus the distance between the first group and a second group, a period less than a width of a color element in the LCD panel. Each group of the plurality groups of diffractive structures with a certain width, and a distance between each group of the plurality groups of diffractive structures greater than the certain width of the group. For a period equal to the width of a first group plus the distance between the first group and a second group, the distance between the first group and the second group that comprises 75% to 85% of the period. The plurality of diffractive structures are located on a surface of the diffractive film facing the second polarizer. A media between the diffractive film and the second polarizer, the media having a second refractive index different from the first refractive index. The plurality of diffractive structures located on a surface of the diffractive film facing away from the second polarizer. A media between the diffractive film and the second polarizer, the media having a second refractive index different from the first refractive index.

Yet another example of an LCD device according to the disclosure includes a diffractive film having a plurality of groups of diffractive structures, where the plurality of groups of diffractive structures are periodically spaced along at least one dimension of the diffractive film. A distance between each group of diffractive structures can be greater than the width of each group. Further, the diffractive film can be disposed in relation to an LCD panel such that, after light that travels through the LCD panel, a portion of the light is redirected by the diffractive structures of the diffractive film.

Implementations of such an LCD device may include one or more of the following features. For a period equal to the width of a first group plus the distance between the first group and a second group, the period is less than a width of a color element in the LCD panel. The diffractive structures are configured to redirect light in two mutually orthogonal dimensions.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
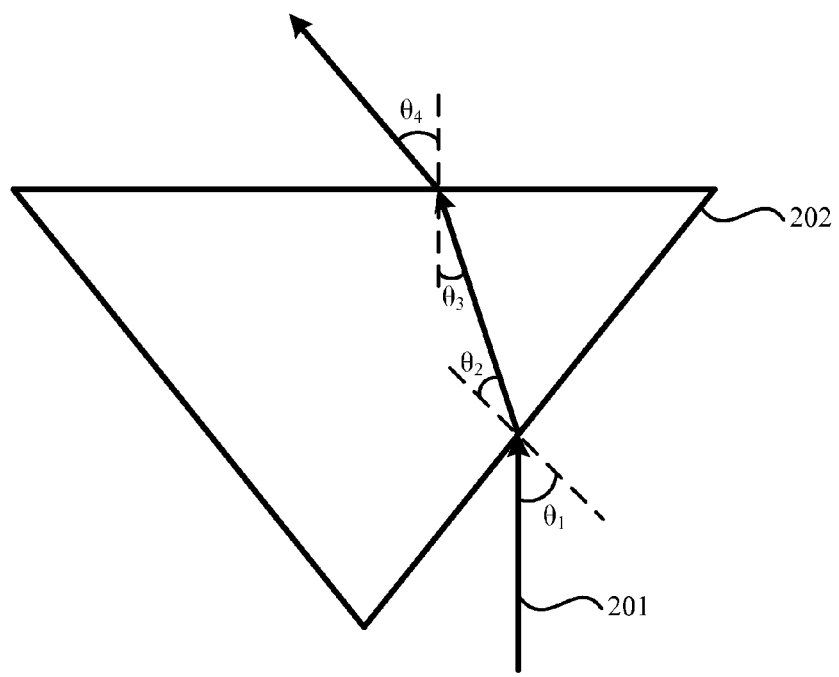
FIG. 2 is a cross section of a prism.

FIG. 2. illustrates the how a prism 202 can redirect a light ray 201 by refraction. In FIG. 2, light ray 201 is incident on one of its angled surfaces with angle $\theta_1$. The angle of the refracted ray inside the prism, $\theta_2$, is given by the equation:

$$n_1 \sin \theta_1 = n_2 \sin \theta_2 \quad (1)$$

derived from the law of refraction, where $n_1$ is the refractive index of the media outside the prism 202 and $n_2$ is the refractive index inside the prism. The refracted light ray is incident on the back surface of the prism 202 at an angle of $\theta_3$ and exits at an angle $\theta_4$. These angles also can be calculated using the law of refraction:

$$n_1 \sin \theta_4 = n_2 \sin \theta_3 \quad (2)$$

With relationship between the angle of light entering the prism and the angle of light exiting the prism established in equations (1) and (2), a prism 202—or a structure comprising one or more prisms—can be engineered to redirect incoming light to a desired output angle. For example, an array of prisms, or prism structures 302, can formed on a sheet of transparent film to form a prism film 300, as shown in FIG. 3. The prism film 300 can redirect light rays 201 incident on the prism film 300 in separate directions. For instance, light rays 201-1 incident on the area 306 without a prism structure 302 will be transmitted through the prism film 300 with virtually no change in direction. The light rays 201-2 incident on the area with a prism structure 302 will be redirected in different directions.

Prism structures 302 can be spaced periodically along at least one dimension of the prism film to ensure light passing through an underlying LCD panel 103 is evenly redirected. Multi-color LCD panels can have multiple color elements or color filters—typically three—per picture element (pixel), and each period 301 (comprising the width 303 of a prism structure 302 plus the distance 304 between two prism structures 302) can be sized in relation to the color elements of the underlying LCD panel 103 to help ensure that each color of the underlying LCD panel 103 is redirected. For example, for an LCD panel 103 having a color element with a width of 100 microns, the period 301 of the prism film 300 would be less than 100 microns. (Although a period 301 that is equal to or bigger than the width of the underlying color element can be used, the resulting image may be subject to interference, such as moiré patterns.) This sizing helps ensure that each period 301 is small enough to cover only one color.

The distance 304 between prism structures 302 in the prism film 300 also can help ensure that a certain amount of light passes through the prism film 300 without being redirected. For example, for each period 301 in the prism film 300, the distance 304 between prism structures 302 can be greater than the width 303 of each prism structure 302. This can help ensure that a majority of the light passes through the prism film 300 without being redirected. Alternatively, the distance 304 between prism structures 302 can comprise 75% to 85% of the period 301, so that roughly 15% to 25% of the light entering the prism film 300 is redirected. Other embodiments contemplate the distance 304 between prism structures 302 as greater than or less than 75% to 85% of the period 301, depending on desired functionality. (Additionally, if prism structures 302 are periodically spaced along two dimensions, the surface area of the space between prism structures 302 will increase, and these numbers can be reduced correspondingly.) Providing such spacing in a prism film 300 helps ensure that an image on an LCD device utilizing the prism film 300 is seen clearly from a position in front of the LCD device.

Figure 3A:
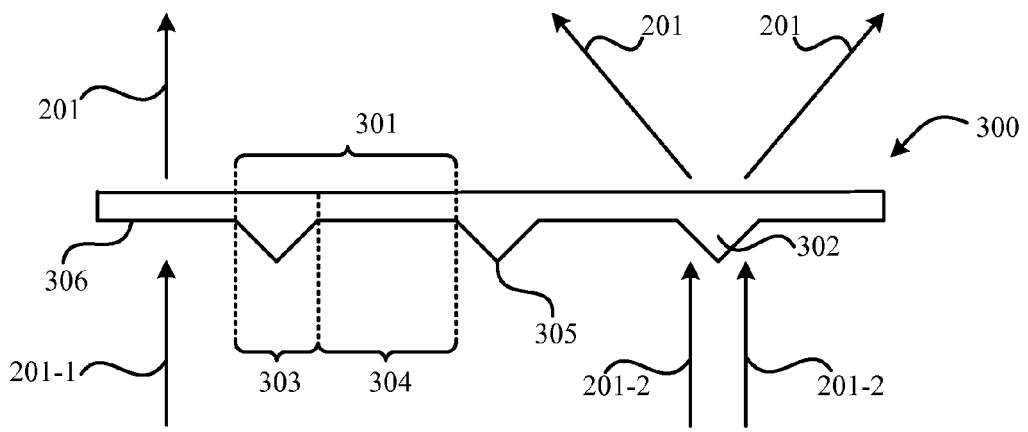
FIG. 3A is a top view of a portion of prism film, according to one embodiment.
Figure 3B:
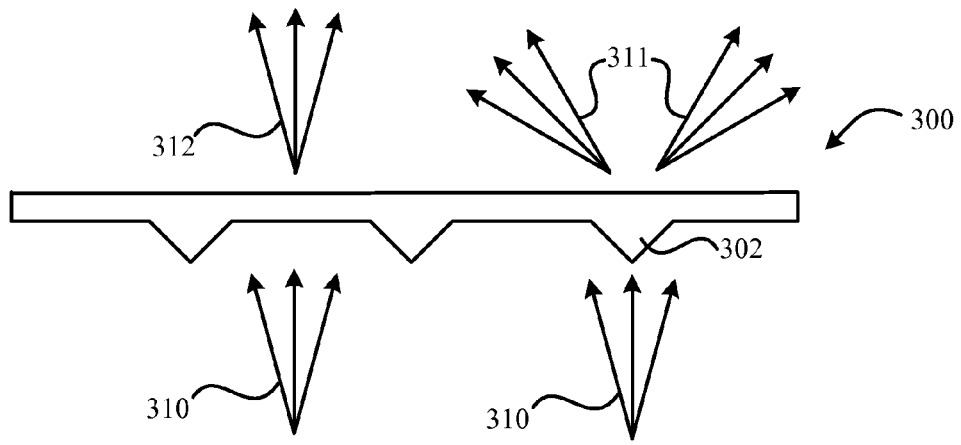
FIG. 3B is another top view of the portion of prism film shown in FIG. 3A.

Although the prism film 300 shown in FIG. 3A is shown to direct incident light in three general directions, the prism film 300 can redirect light from an underlying LCD panel 103 anywhere within the enhanced viewing angle provided by the prism film 300. This is due to the fact that light from an underlying LCD panel 103 enters the prism film 300 at various angles. As shown in FIG. 3B, light incident on a prism film 300 that comes from an underlying LCD panel (not shown) can have a cone-like shape. These cones of light 310 can have a half-angle of +/−20 to 30 degrees. The prism film 300 causes cones of light 310 passing through the prism structures 302 to form redirected cones of light 311, while other cones of light 312 are not redirected. The prism film 300 can be engineered to ensure that redirected light cones 311 and non-redirected light cones 312 overlap to produce clear viewing of the image on the LCD device from anywhere within the enhanced viewing angle provided by the prism film 300. Additionally, because different colors of light are redirected by the prisms at slightly different angles, this spreading of light provided by cones of light 310 helps ensure the consistency of colors from all viewing positions within the enhanced viewing angle.

The prism film 300 can be engineered in a variety of ways, to account for factors such as desired viewing angle and half-angle of incident light (i.e., cones of light 310), as well as manufacturing concerns. For example, the prism film 300 can be created by diamond machining a high refractive index UV curable polymer. This type of polymer can have an index of refraction of roughly 1.54, but other polymers having indices of refraction greater or less than this can also be used. For example, many materials have an index of refraction of 1.4, and these materials can be used in the prism film 300. Generally speaking, the prism film can be made from virtually any material that has an index of refraction greater than the index of refraction of the medium adjacent to the prism film 300 through which the incident light travels. Additionally or alternatively, prism films 300 can be made from a plurality of materials, which may have different refractive indices.

Figure 3C:
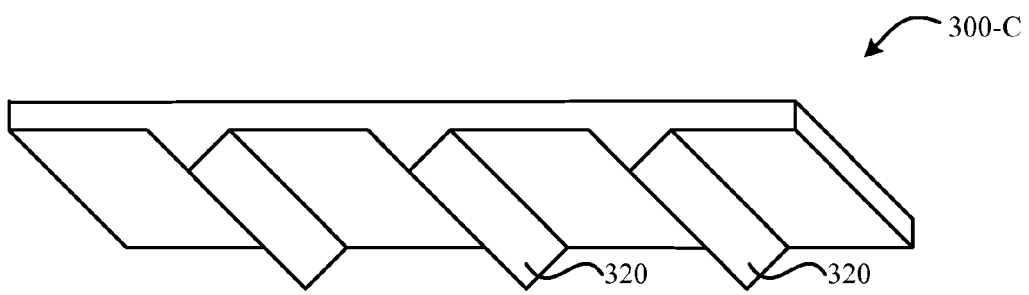
FIG. 3C is a perspective view of a portion of prism film, according to one embodiment.

FIG. 3C shows a perspective view of an embodiment of a prism film 300-C that redirects light along one dimension. Specifically, prism structures are elongated along a first dimension to form prism columns 320. These prism columns 320 redirect light along a second dimensions substantially orthogonal to the first dimension. Such one-dimensional redirection of light can be useful in many applications. For example, an LCD television or computer monitor with a prism film 300-C disposed such that the prism columns 320 are oriented vertically across the screen will provide an enhanced horizontal viewing angle.

Prism films 300 also can be used to enhance the viewing angle of an LCD device in two dimensions. For example, if a first prism film 300 such as the prism film 300-C of FIG. 3C is disposed on an LCD device such that the prism columns 320 are oriented vertically with respect to the LCD device, a second, similar prism film 300 can be placed over the first prism film 300 such that the that the prism columns 320 of the second prism film 300 are oriented horizontally with respect to the LCD device. In this scenario, the first prism film would enhance the horizontal viewing angle of the LCD device, and the second prism film would enhance the vertical viewing angle. Alternatively, prism structures 302 can be periodically spaced in two dimensions to enable a single prism film 300 to enhance the viewing angle of an LCD device in two dimensions. For example, the triangular prism structures 302 of FIGS. 3A and 3B could be pyramid shaped (rather than elongated in one dimension, as shown in FIG. 3G) and spaced periodically in two dimensions. Depending on desired functionality, the shapes of the prisms and/or the distance between prisms could be different in the different dimensions.

The shape of the prism structures 302 of the prism film 300 can vary, depending on numerous considerations such as manufacturing considerations and desired functionality. For example, and not by way of limitation, prism structures 302 can be triangular, triangular-based pyramidal, square-based pyramidal, conical, polygonal, cylindrical, spherical, half-spherical, trapezoidal, cylindrical, half-cylindrical, etc. Additionally, depending on desired functionality, prism structures 302 can be shaped differently along different dimensions. Moreover, multiple prism structures 302 of different shapes can be used on a single prism film 300.

The shapes of the prism structures 302 can be altered to provide different functionality, and may require a particular orientation of the prism film 300. For example, with respect to triangular prism structures, the angle of the sides of the prism structures can be 45 degrees in some embodiments, but other embodiments can include angles of a little as 30 degrees or less and/or as much as 60 degrees or more. (As shown in FIG. 2, this angle can impact how much the prism redirects any incident light.) Additionally, is generally desirable to orient the prism film 300 with respect to the underlying LCD panel such that light from the LCD panel 103 is incident on the surface of the prism film 300 having the prism structures 302, regardless of the shape of the prism structures 302. Put another way, it is generally desirable to ensure the apex of the prism structures 302 (see, e.g., item 305 of FIG. 3A) faces the polarizer 102 through which light travels after passing through the LCD panel 103, to help ensure proper redirection of the light from the LCD panel and reduce the likelihood that the light will be reflected back toward the light polarizer 102 due to total internal reflection.

Figure 1:
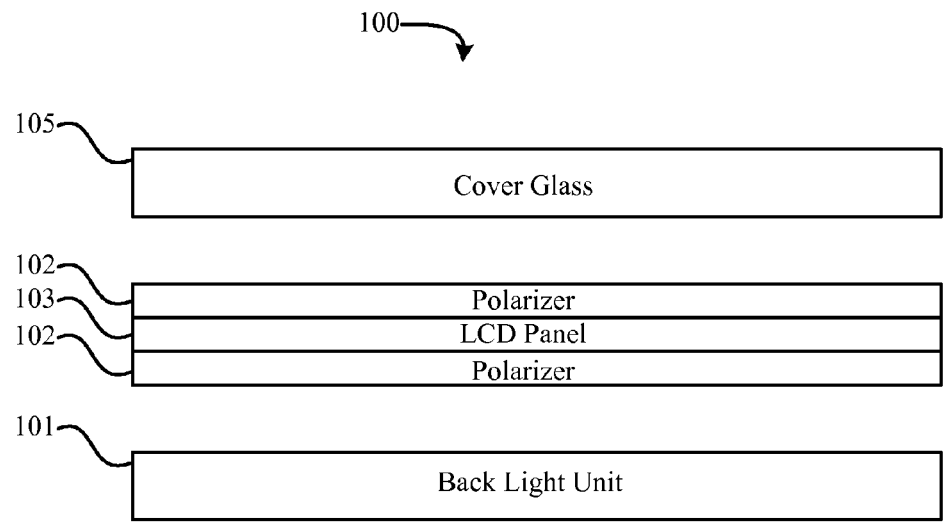
FIG. 1 is simplified a top view of a common LCD device.
Figure 4:
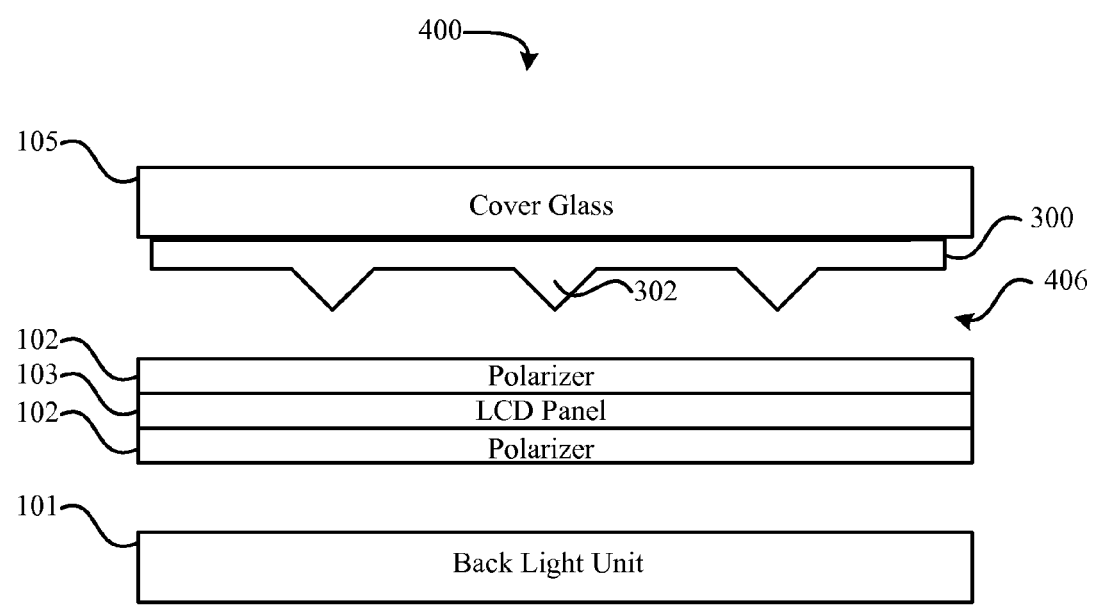
FIG. 4 is simplified a top view of an embodiment of an LCD device with a prism film.

FIG. 4 illustrates how a prism film 300 can be utilized to create a modified LCD device 400 having a wider field of view than a the common LCD device 100 of FIG. 1. For example, the prism film 300 can be located such that light from the back light unit 101 is redirected by the prism film 300 after it travels through the polarizers 102 and LCD panel 103. The viewing angle of the LCD device 400 therefore is enhanced by the refraction angle of the prism film.

The space 406 between the prism film 300 and the polarizer 102 can be filled with various types of media, or simply can be left empty. An empty space 406 can allow for the prism film 300 to more easily redirect light because air (or a vacuum) has a very low index of refraction. Alternatively, an adhesive or other material can occupy the space 406 to provide for additional structural support of the prism film 300 and/or cover class 105. As indicated above, as long as the material has a lower index of refraction than the prism film 300 (or, more precisely, the prism structures 302 in the prism film 300), the prism film 300 can redirect the light passing through the LCD panel 103 and polarizers 102 effectively. Thus, if an adhesive is used, the adhesive preferably should have a low refractive index.

Figure 5A:
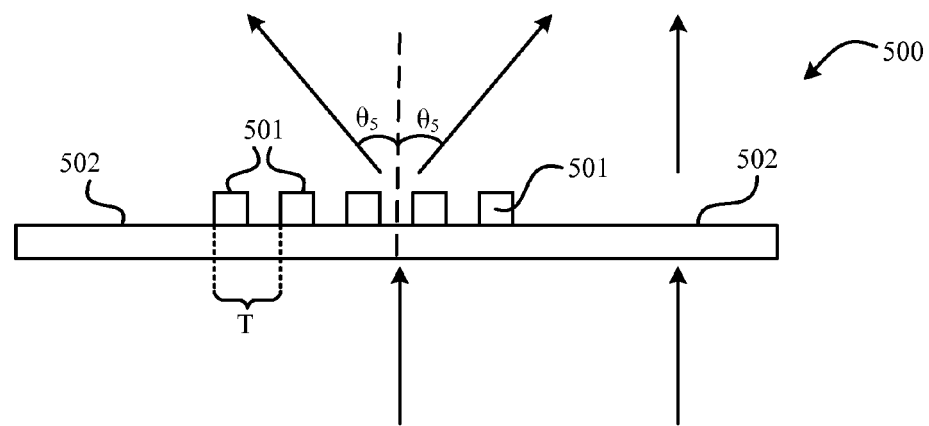
FIG. 5A is a top view of one embodiment of a portion of diffractive film.
Figure 5B:
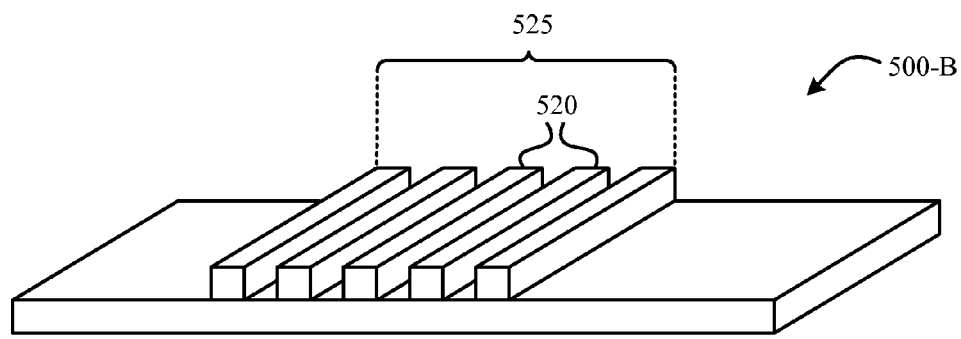
FIG. 5B is a perspective view of a portion of diffractive film, according to one embodiment.
Figure 5C:
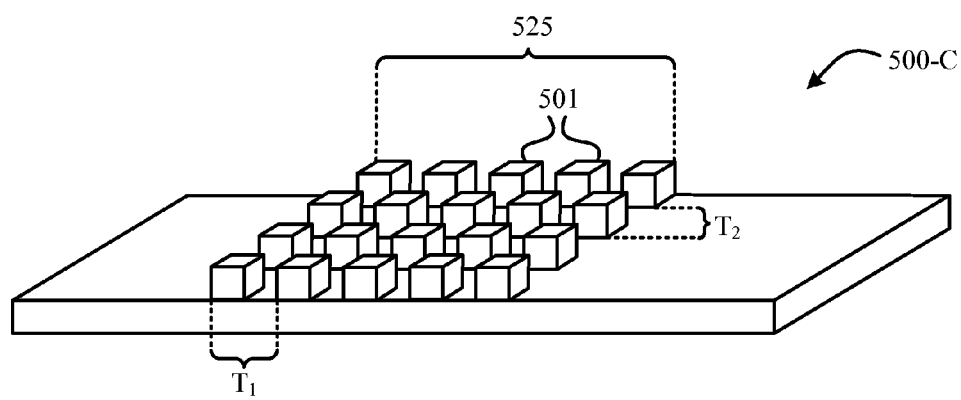
FIG. 5C is a perspective view of a portion of diffractive film, according to another embodiment.

FIGS. 5A-5C show how diffractive films 500 can be used in a similar manner as the prism films 300 discussed above. While prism films 300 use refraction to redirect light rays from an underlying LCD panel 103, diffractive films 500 can use diffraction to redirect light in a similar fashion. For example, FIG. 5A shows a diffractive film 500 that uses a group of diffractive elements 501 in the same manner as the prism film 300 used prisms 302. The spacing between the diffractive elements 501 plus the width of the diffractive elements 501 define a period T that is related to the diffraction angle $\theta_5$ as given by the equation:

$$\sin \theta_5 = \lambda/T \quad (3)$$

Because each group of diffractive elements 501 of a diffractive film 500 can redirect light in a similar fashion as a prism 302 in a prism film 300, groups of diffractive elements 501 and be periodically spaced in a similar fashion as the prism structures 302 of the prism films 300. Specifically, a diffractive film 500 can include portions 502 without diffractive elements 501, thereby enabling at least a portion of the light to pass through without being redirected. Spacing between groups of diffractive elements 501 can be similar to the spacing between prism structures 302 discussed above. For example, for a period equal to the width of each group of diffractive elements plus the spacing between groups, the spacing between groups can be larger than 50% of the period and/or fall within a range of 75% to 85% of the period.

Diffractive elements 501 of a diffractive film 500 typically will be smaller than corresponding prism structures 302 of a prism film 300. For example, a prism film 300 with a plurality of prism structures 302 periodically spaced along one dimension might have a period of 100 microns. If the spacing between prism structures 302 comprises 80% of the period, than each prism structure would be approximately 20 microns wide. A corresponding diffraction film 500 therefore might have a group of diffractive elements 501 approximately 20 microns wide while period T (corresponding to the width of an individual diffractive element and the width of the space between two diffractive elements) is approximately 0.9 microns. In this example, the diffractive film 500 therefore utilizes a group of roughly 20 diffractive elements 501 (i.e., 20 periods T) to correspond to a single prism 302 of a prism film 300.

The height of the diffractive elements 510 can depend manufacturing processes and other factors, but generally will be much smaller than the height of a corresponding prism structure. For example, a triangular prism structure approximately 20 microns wide can be roughly 10 microns high. On the other hand, each diffractive element 501 of a corresponding group of diffractive elements 501 approximately 20 microns wide may be only approximately 0.2 to 0.3 microns high.

The manufacture of a diffractive film 500 can differ from the manufacture of a prism film 300. For example, rather than utilizing diamond machining, a diffractive film 500 can be created using UV casting and/or embossing techniques on a variety of materials, such as UV curable polymers. Such manufacturing techniques can facilitate the creation of a diffractive film 500 that can enhance the viewing angle of an LCD device in two dimensions. Some techniques for manufacturing a diffractive film 500 are provided in U.S. Pat. No. 6,775,037, entitled "Grating Matrix Recording System," which is incorporated herein in its entirety.

The manufacture of diffractive elements 501 can impact the shape of the diffractive elements 105. For example, diffractive elements 501 with a binary structure (e.g., a square shape, such as those shown in FIGS. 5A-5C) may be created by etching, but may be difficult to produce using UV casting and/or embossing techniques. However, UV casting and/or embossing can create sinusoidal diffractive elements 501. Diffractive elements 501 having profiles other than binary or sinusoidal are also contemplated.

FIG. 5B is a perspective view of an embodiment of a diffractive film 500-B configured to redirect light along one dimension. Similar to the prism film 300-C of FIG. 3C, the diffractive film 500-B includes diffractive elements elongated in a first dimension to form diffractive element columns 520. These diffractive element columns 520 redirect light along a second dimension substantially orthogonal to the first dimension. Moreover, diffractive element column groups 525 can be periodically spaced to ensure a certain amount of light passes through the diffractive film with little or no redirection.

FIG. 5C is a perspective view of an embodiment of a diffractive film 500-C configured to redirect light along two dimensions. Diffractive elements 501 in this embodiment are not elongated in one dimension, but instead are periodically spaced in two dimensions. Moreover, the spacing and/or with of the diffractive elements 501 may be different in the two dimensions such that a period $T_1$ in one dimension may be different than a period $T_2$ in the other dimension, providing a different viewing angle in each dimension. Furthermore, groups 525 of diffractive elements 501 can be spaced periodically in one or both dimensions, and such spacing can vary depending on desired functionality. Finally, it can be noted that diffractive films 500, such as those shown in FIGS. 5A-5C, can be oriented with diffractive elements 501 facing inward toward an underlying LCD panel 103 and polarizer 103, or outward toward a cover glass 105, with little or no effect on the diffractive film's effectiveness at redirecting light.

It is to be understood that the examples, figures, and embodiments described above are for illustrative purposes only and that various modifications or changes in light thereof will be suggested to persons skilled in the art and are to be included within the spirit and purview of this application and scope of the appended claims. For example, while the figures have been simplified to illustrate certain features described herein, they are not drawn to scale. Furthermore, certain features in the examples, figures, and embodiments may be removed, added, combined, or separated into different components, while keeping with the spirit and purview of this application. Therefore, the above description should not be understood as limiting the scope of the invention as defined by the claims.

What is claimed is:

1. A liquid crystal display (LCD) device comprising:
    a back light unit;
    a first polarizer;
    an LCD panel;
    a second polarizer;
    a transparent cover; and
    a film for redirecting light, the film having:
        a first refractive index,
        a plurality of prism structures for redirecting light, the plurality of prism structures located on a surface of the film and periodically spaced along at least one dimension of the prism film, and
        a plurality of areas on the surface of the film without prism structures for redirecting light;
    wherein:
        each of the plurality of prism structures has a certain width;
        a distance between each of the plurality of prism structures is greater than the certain width of the prism structure; and
        the film is located between the second polarizer and the transparent cover.

2. The LCD device recited in claim 1, wherein, for a period equal to the width of a first prism structure plus the distance between the first prism structure and a second prism structure, the distance between the first prism structure and the second prism structure comprises 75% to 85% of the period.

3. The LCD device recited in claim 1, wherein an apex of each of the plurality of prism structures faces the second polarizer.

4. The LCD device recited in claim 1, further including a media between the prism film and the second polarizer, the media having a second refractive index lower than the first refractive index.

5. The LCD device recited in claim 1, wherein each of the plurality of prism structures is triangular.

6. The LCD device recited in claim 1, for a period equal to the width of a first prism structure plus the distance between the first prism structure and a second prism structure, the period is less than a width of a color element in the LCD panel.

7. A liquid crystal display (LCD) device comprising:
    a back light unit;
    a first polarizer;
    an LCD panel;
    a second polarizer;
    a transparent cover; and
    a diffractive film having:
        a first refractive index, and
        a plurality of diffractive structures comprising a plurality of groups of diffractive structures periodically spaced along at least one dimension of the diffractive film;
    wherein:
        each group of the plurality groups of diffractive structures has a certain width;
        a distance between each group of the plurality groups of diffractive structures is greater than the certain width of the group; and
        the diffractive film is located between the second polarizer and the transparent cover.

8. The LCD device recited in claim 7, wherein, for a period equal to the width of a first group plus the distance between the first group and a second group, the period is less than a width of a color element in the LCD panel.

9. The LCD device recited in claim 7, wherein, for a period equal to the width of a first group plus the distance between the first group and a second group, the distance between the first group and the second group comprises 75% to 85% of the period.

10. The LCD device recited in claim 7, wherein the plurality of diffractive structures are located on a surface of the diffractive film facing the second polarizer.

11. The LCD device recited in claim 10, further including a media between the diffractive film and the second polarizer, the media having a second refractive index different from the first refractive index.

12. The LCD device recited in claim 7, wherein the plurality of diffractive structures are located on a surface of the diffractive film facing away from the second polarizer.

13. The LCD device recited in claim 12, further including a media between the diffractive film and the second polarizer, the media having a second refractive index different from the first refractive index.

14. A liquid crystal display (LCD) device comprising:
a diffractive film having a plurality of groups of diffractive structures, wherein:
the plurality of groups of diffractive structures are periodically spaced along at least one dimension of the diffractive film;
a distance between each group of diffractive structures is greater than the width of each group; and
the diffractive film is disposed in relation to an LCD panel such that, after light that travels through the LCD panel, a portion of the light is redirected by the diffractive structures of the diffractive film.

15. The LCD device recited in claim 14, wherein, for a period equal to the width of a first group plus the distance between the first group and a second group, the period is less than a width of a color element in the LCD panel.

16. The LCD device recited in claim 14, wherein the diffractive structures are configured to redirect light in two mutually orthogonal dimensions.

\* \* \* \* \*